United States Patent
Ainsworth et al.

[11] Patent Number: 5,982,478
[45] Date of Patent: Nov. 9, 1999

[54] FLUID VELOCITY MEASUREMENT APPARATUS

[75] Inventors: Roger William Ainsworth; Steven John Thorpe, both of Oxford, United Kingdom

[73] Assignee: Isis Innovation Limited, Oxford, United Kingdom

[21] Appl. No.: 08/737,678

[22] PCT Filed: Jun. 2, 1995

[86] PCT No.: PCT/GB96/01278

§ 371 Date: Feb. 19, 1997

§ 102(e) Date: Feb. 19, 1997

[87] PCT Pub. No.: WO95/33999

PCT Pub. Date: Dec. 14, 1995

[30] Foreign Application Priority Data

Jun. 6, 1994 [GB] United Kingdom ............. 9411280

[51] Int. Cl.[6] ................. G01P 3/36; G02F 1/35
[52] U.S. Cl. ............................ 356/28; 359/326
[58] Field of Search ............ 356/28, 28.5; 359/326

[56] References Cited

U.S. PATENT DOCUMENTS

| | | | |
|---|---|---|---|
| 3,941,670 | 3/1976 | Pratt, Jr. ......................... | 204/158 R |
| 4,919,536 | 4/1990 | Komine ............................ | 356/28.5 |
| 4,988,190 | 1/1991 | Miles .............................. | 356/28 |
| 5,153,665 | 10/1992 | Weinstein ......................... | 356/28 |

FOREIGN PATENT DOCUMENTS

| | | |
|---|---|---|
| 4013702 | 10/1991 | Germany . |
| WO 88/07179 | 9/1988 | WIPO . |

*Primary Examiner*—Stephen C. Buczinski
*Attorney, Agent, or Firm*—Wenderoth, Lind & Ponack, L.L.P.

[57] ABSTRACT

Fluid velocity measurement apparatus which utilizes Doppler-shift spectral analysis includes a narrow line width light source, the light from which passes through a beam expander to provide an irradiated region, for example a two-dimensional plane, in which velocity measurements may be taken. Light scattered from small particles in the irradiated region is collected in an imaging system which enables spectral analysis of the scattered light for determining the velocity of the light scattering particles in the irradiated region. A single camera is used in the imaging system to obviate the need for costly electronics to synchronize images obtained Also to improve the accuracy of measurement, selected parameters of the apparatus may be measured to allow for perturbations in the velocity measurements obtained.

18 Claims, 5 Drawing Sheets

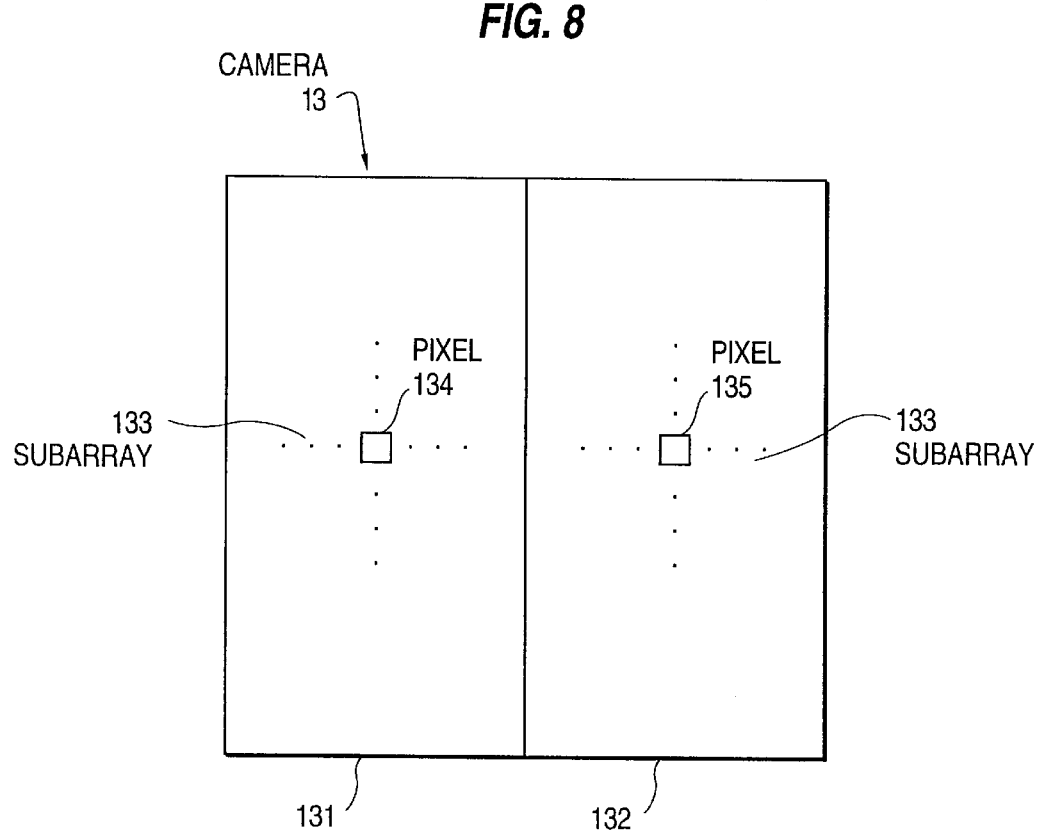

FIG. 9

```
┌─────────────────────────────────────┐
│ DIVIDE COLLECTED LIGHT INTO         │
│ FIRST AND SECOND PORTIONS           │
└─────────────────────────────────────┘
                  │
                  ▼
┌─────────────────────────────────────┐
│ DIRECT OUTPUT OF FREQUENCY-         │
│ TO-INTENSITY CONVERTER TO FIRST     │
│ REGION OF THE IMAGE FRAME           │
│ AND                                 │
│ DIRECT SECOND PORTION OF THE        │
│ COLLECTED LIGHT TO THE SECOND       │
│ REGION OF THE IMAGE FRAME           │
└─────────────────────────────────────┘
```

FLUID VELOCITY MEASUREMENT APPARATUS

BACKGROUND OF THE INVENTION

The present invention relates to fluid velocity measurement apparatuses and particularly an apparatus for determining the velocity of a fluid at any point in the fluid which utilizes Doppler-shift spectral analysis.

In recent years there has been increasing interest in the physics of fluid dynamics in turbulent systems, for example fluid flow through turbine engines and the aerodynamic properties of cars. One of the problems encountered in the study of fluid dynamics is that of establishing accurate measurements of the velocity of the fluid at any point in the fluid. Non-intrusive techniques have in general been based on single-point laser Doppler anenometry (IDA). Unfortunately, to date the results from using LDA have included undesirably large deviations owing to a number of factors affecting the size of the potential errors in the system. Moreover, such techniques require repeated spatial scanning cycles to obtain data over a two or three dimensional region and so are time consuming and are limited to steady state flow.

An alternative method of measuring velocities in a fluid is particle image velocimetry (PIV) but this method involves problems with detection and processing of the data because images are overlaid. Also, obtaining three dimensional information on a fluid flow is very difficult using PIV.

In U.S. Pat. No. 4,919,536 a real-time system for measuring velocities in a turbulent fluid system in a two dimensional region is described using a Doppler Global Velocimetry (DGV) technique. The system described has a laser which emits a beam which is passed through a lens system. The lens system expands the beam into a sheet of light incident on a region of the fluid for which velocity measurements are required. The fluid is seeded with particles, which are carried in the fluid, so that when the particles pass through the sheet of lights the particles scatter the light and the frequencies of the scattered light are Doppler-shifted in dependence on the individual velocities of the particles. In this way a two dimensional picture of the different velocities of the fluid in the illuminated region may be achieved. The scattered light is observed through a further lens system which focuses the scattered light and then splits the resultant beam in two. Half of the beam is directed to a reference image camera and half of the beam is directed through an iodine cell, functioning as a frequency-to-intensity converter, and then to a separate Doppler image camera. The laser is tuned to emit light at a frequency which corresponds to a 50% point on the transmission profile for iodine. In this way Doppler shifts in the frequency of the scattered light to both higher and lower frequencies can be detected as variations in the intensity of the scattered light emerging from the iodine cell. The system also includes control circuitry for synchronization and image capture of the images from the two cameras to enable the display of the measured velocity field in real-time.

Although the DGV technique described above enables measurement of flow velocities of a fluid in a region, problems remain in achieving accurate absolute measurements for the velocities and in reducing the sizes of the errors in such a system. For example, the light emerging from the laser has a tendency to drift from the desired frequency; the response of the iodine cell to the incident light and in particular its transmission characteristics can vary considerably with temperature; and aberrations in the lens system can be introduced for example by stresses applied to the optical elements as a result of the manner in which the optical elements are mounted and by crystal formation on the windows of the iodine cell. It is also essential that the two light paths of the scattered light beam are accurately aligned or the results from the two cameras will be misrepresentative of the scattered light intensity. Moreover, the imaging electronics for synchronizing the images from the two cameras and for image capture is both costly and complicated. The definition of the velocity field measurements may, as a result, be poor. In fact a deviation of $\pm 7.5$ ms$^{-1}$ for calculated fluid velocities is normally allowed for.

SUMMARY OF THE INVENTION

The present invention seeks to overcome the problems identified above with known fluid velocity measurement systems and seeks to provide apparatuses and methods which utilize the DGV technique to provide high definition, substantially error free absolute measurements of velocities in systems and particularly but not exclusively for turbulent fluid systems.

In a first aspect of the present invention, a fluid velocity measuring apparatus includes a narrow linewidth light source; a lens or lens system arranged to direct the output of the light source onto a selected region of a moving fluid seeded with light scattering particles; an imaging system for analyzing light scattered from the selected region of the fluid; and a velocity calculating device in communication with the imaging system for calculating the velocity of the fluid in the selected region in dependence on the Doppler-shift in frequency of the scattered light with respect to the frequency of the output of the light source. The imaging system includes a beam splitting device for collecting the scattered light and for dividing the collected light into first and second portions, a frequency-to-intensity converter for receiving the first portion of the collected light and for emitting light the intensity of which is representative of the frequency of the collected light, a common light intensity detector having a single image frame divided into first and second regions, and an optical system arranged to direct the converter output and the second portion of the collected light separately to the first and second regions of the image frame of the detector respectively.

With the present invention therefore the output from the frequency-to-intensity converter and the second portion of the collected scattered light are measured by a single device which requires a single image capture device and generates automatically synchronized measurements of the intensities of the converter output and second portion for input into the velocity calculating device. This significantly simplifies the measurement and calculation of the velocity of the fluid flow and reduces the complexities of the electronic control and communication subsystems necessary between the intensity detector and the velocity calculating device. Moreover, it enables accurate and detailed post-measurement analysis to be performed on transient fluid flows where synchronization of the intensity measurements is of particular importance.

In an embodiment of the apparatus the lens or lens system is arranged to focus the output of the light source to a selected point in the moving fluid whereby measurement of the average spatial velocity of the fluid at the selected point may be made. With this embodiment measurement of the average spatial velocity can have high time resolution.

In an alternative embodiment the lens system is in the form of a beam expander which generates a sheet of light from the output of the light source which intersects the moving fluid at a selected two dimensional region. This enables a plurality of different velocity measurements to be made simultaneously across the selected region of the moving fluid. With this alternative embodiment each of the first and second regions of the intensity detector may be divided into corresponding arrays of pixel elements, with corresponding pixels relating to the same spatial location in the selected region of the fluid. For this purpose the intensity detector may be a charge-coupled device (CCD) camera.

Preferably, the frequency-to-intensity converter is in the form of a cell containing a gas or vapor the absorption characteristics of which vary with light frequency. For example, the converter may be an iodine cell arranged in the path of the first portion of the collected light.

Moreover, there may be further provided a device for alignment of the imaging system prior to operation. The alignment device may be in the form of a point light source and adjusting device for adjusting the elements of the optical system thereby ensuring the corresponding pixels receive light from the same spatial location. Alternatively, the imaging system need not be exactly aligned prior to operation and instead post analysis of the intensity data collected may incorporate data manipulation to allow for alignment.

It is preferred that the light source be a laser, for example an argon ion laser or an Nd:YAG laser. Also, the velocity calculating device may be in the form of a computer having a memory in which are stored algorithms used for calculating the velocities of the fluid. The beam splitting device may be in the form of an arrangement of lenses which collect and focus the scattered light onto a dielectric beam splitter. Also, the optical system may consist of one or more mirrors and a dielectric beam splitter for directing the second portion of the collected light and the converter output onto the intensity detector.

Ideally, the imaging system is arranged at an oblique angle to the direction of motion of the fluid thereby enabling global measurement of the fluid velocities. The angle of the imaging system to the direction of motion of the fluid may be selected to maximize the amount of scattered light collected.

The present invention further provides a method of calculating the velocity of a moving fluid. The method includes seeding the moving fluid with light scattering particles; illuminating a selected region of the fluid with light having a narrow linewidth; collecting light scattered from the selected region of the fluid and dividing the collected light into first and second portions; and analyzing the first portion of the collected light by passing it through a frequency-to-intensity converter whereby the intensity of the output of the converter is representative of the frequency of the light passing through it. The method also includes directing the second portion of the collected light and the output of the converter towards a common light intensity detector having a single image frame; measuring the intensity of the output of the converter and the intensity of the second portion of the collected light incident on the single image frame, and calculating, in dependence on the measured intensities, the frequency of the scattered light and the Doppler-shift in frequency of the scattered light with respect to the frequency of the light illuminating the selected region and thereby the velocity of the moving fluid in the selected region.

In a second aspect of the present invention, the fluid velocity measuring apparatus includes a narrow linewidth light source, a lens or lens system arranged to direct the output of the light source onto a selected region of a moving fluid seeded with light scattering particles; an imaging system for analyzing light scattered from the selected region of the fluid and including a pre-calibrated frequency-to-intensity converter for emitting light the intensity of which is representative of the frequency of the scattered light; a measuring device for monitoring one or more parameters of the apparatus; and a velocity calculating device having an addressable memory in which is stored calibration data of the frequency-to-intensity converter with respect to the one or more monitored parameters of the apparatus. The velocity calculating device is in communication with the imaging system and the measuring device for calculating the frequency of light incident on the frequency-to-intensity converter with respect to the monitored one or more parameters, the Doppler-shift in frequency of the scattered light with respect to the frequency of the output of the light source and thereby the velocity of the moving fluid in the selected region.

With the apparatus described, significantly greater accuracy of measurement of the fluid velocity may be achieved by ensuring that variations in the performance of the apparatus are monitored during use so that the calculated velocity may be adjusted by an amount dependent upon the monitored parameters.

In a preferred embodiment of the second aspect, the apparatus further includes a Fabry-Perot interferometer and one or more photodiodes for use in pre-calibrating the frequency-to-intensity converter.

Preferably the measuring device monitors fluctuations in the frequency of the output of the light source during use. The measuring device may comprise a further frequency-to-intensity converter and one or more photodiodes. In this way exact control of the source to ensure a constant light output is not necessary since any fluctuations in the output are monitored and taken into account in the final calculation of the velocity. The measuring device may alternatively or in addition include a device for monitoring variations in the temperature of the pre-calibrated frequency-to-intensity converter in the imaging system.

The second aspect of the present invention further provides a method of calculating the velocity of a moving fluid. The method includes calibrating a frequency-to-intensity converter and storing the calibration data in a memory; seeding the moving fluid with light scattering particles; and illuminating a selected region of the fluid with light having a narrow linewidth. The method also includes monitoring one or more parameters of the apparatus used to calculate the velocity of the moving fluid; analyzing light scattered from the selected region of the moving fluid via the pre-calibrated frequency-to-intensity converter the output intensity of which is representative of the frequency of the scattered light; and measuring the output intensity of the converter; and calculating, in dependence on the measured output intensity and the monitored one or more parameters with reference to the stored calibration data, the frequency of the scattered light and the Doppler-shift in frequency of the scattered light with respect to the frequency of the light illuminating the selected region and thereby the velocity of the moving fluid in the selected region.

Ideally, the frequency-to-intensity converter in the imaging system is calibrated by measuring the output intensity of the converter with respect to different known frequencies of light at different known temperatures. During calibration, the frequency of the light incident on the converter may be measured by a Fabry-Perot interferometer and the output intensity from the converter may be measured by a photodiode.

In a third aspect of the present invention, a frequency-to-intensity converter includes a housing defining a chamber and having opposing windows substantially transparent to light; an absorption device mounted within the housing chamber and having windows substantially transparent to light arranged to face the windows of the housing. The absorption device defines an absorption chamber containing a gas or vapor the light absorption properties of which vary with light frequency. The absorption device further includes a downwardly directed member in communication with the absorption chamber and a temperature controlling device for maintaining the housing chamber and thereby the absorption chamber at a substantially constant temperature and including cooling device for maintaining the downwardly directed member of the absorption device at a temperature less than the temperature of the housing chamber and absorption chamber.

In this way the accuracy of the frequency-to-intensity converter may be improved. Condensation of the gas or vapor on the windows is prevented and the density of the gas or vapor is held substantially constant.

Preferably the cooling device is in the form of a thermoelectric cooler mounted about the downwardly directed member which may be in the form of a finger.

A fourth aspect of the present invention, provides a method of mounting optical elements in which a metal is evaporated onto the edges of an optical element and thereafter the optical element is mounted on a support by attaching the support to the metal on the edges of the element. Preferably the support is attached to the metal by soldering.

In this way the optical elements having less optical aberration caused by stresses applied across the element can be securely mounted. Also, where the optical elements are in the form of windows in a frequency-to-intensity converter cell it has been found that the lifetime of the cell is greatly improved by mounting the windows in the cell using the method described.

It will be apparent that reference herein to light and a light source is reference to electromagnetic radiation having frequencies in the visible region but extending to infra-red and ultraviolet frequencies. Hence, reference to windows being substantially transparent to light refers to the windows being substantially transparent to light at the frequencies referred to above.

In addition, reference to the narrow linewidth of the output of the light source is intended as reference to the output of the source having a very limited or narrow range of frequencies, that is sufficiently narrow that a Doppler-shift in frequency is capable of being detected by virtue of variations in the output intensity of the frequency-to-intensity converter. Hence, the linewidth of the light must be substantially less than the absorption feature of the active gas or vapor in the converter. A monochromatic light source is suitable.

BRIEF DESCRIPTION OF THE DRAWINGS

An embodiment of the invention will now be described by way of example with reference to the accompanying drawings, in which:

FIG. 8 illustrates an image frame of a camera divided into two adjacent regions having respective two dimensional subarrays of pixels; and FIG. 9 is a flow chart of the processing related to the regions of the image frame.

DETAILED DESCRIPTION OF THE PREFERRED EMBODIMENT

Figure 1:
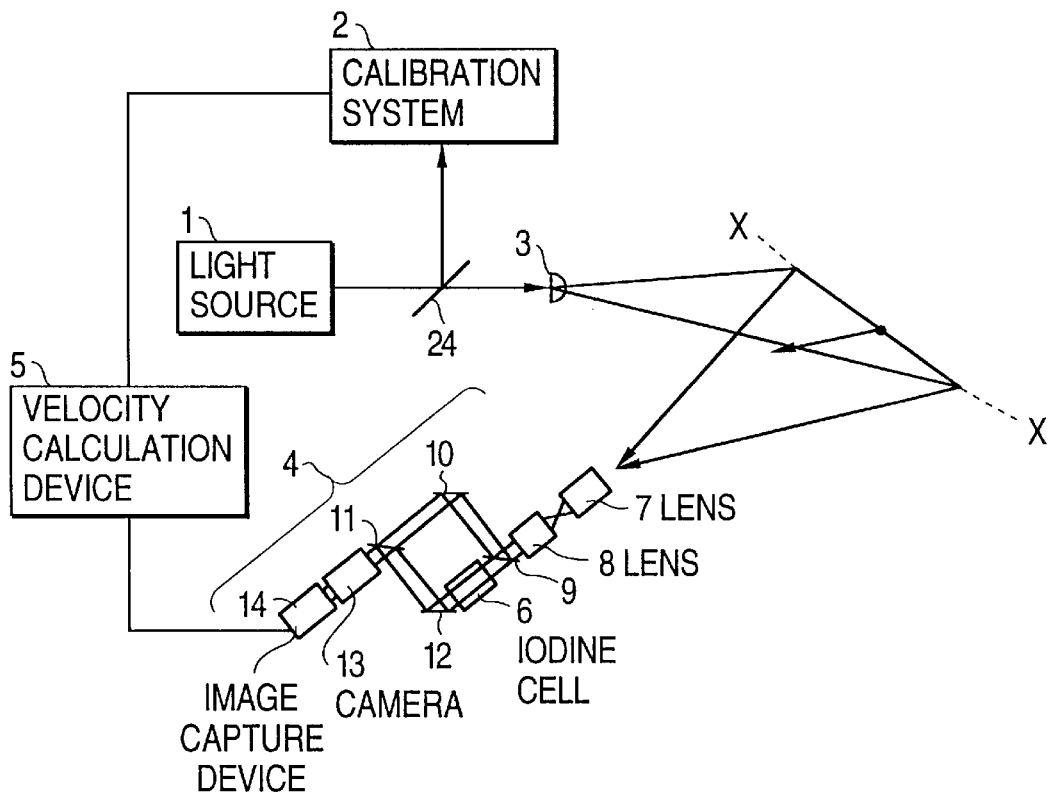
FIG. 1 is a diagram of a fluid velocity measurement apparatus in accordance with the present invention.

The fluid velocity measurement apparatus shown in FIG. 1 utilizes and provides improvements over the DGV technique described in U.S. Pat. No. 4,919,536. The contents of U.S. Pat. No. 4,919,536 are incorporated herein by reference. The apparatus shown in FIG. 1 includes a light source 1, a calibration system 2, a beam expander 3, an imaging system 4 and a velocity calculating device 5. The light source 1 is a laser source which emits light of narrow linewidth capable of being tuned across an atomic or molecular absorption characteristic. The preferred molecular absorption characteristic is that of iodine and so the laser source 1 is tunable across an absorption feature of iodine. Examples of suitable laser sources are the 514.5 nm emission of an argon ion laser or the 532 nm emission of a frequency doubled pulsed Nd:YAG laser. The linewidth of the laser source must be significantly narrower than the width of the absorption feature of the atom or molecule concerned, in this case iodine, so that the different frequencies of the Doppler shifted light are absorbed to differing degrees and the output light intensity of the imaging system 4 varies with respect to the different frequencies. The narrow linewidth may be accomplished with an argon ion laser by use of an inter-cavity etalon and with a Nd:YAG laser by use of injection seeding.

To assist in obtaining accurate absolute measurement of the velocity field, the output from the laser source 1 is monitored by the calibration system 2 which outputs calibration data in the form of measured emitted light frequency to the velocity calculating device 5. A more detailed discussion of the calibration system 2 appears later with respect to a discussion of FIG. 3.

The beam expander 3 is in the form of a lens system, for example a combination of cylindrical lenses, which expands the light beam from the laser source 1 to a light sheet which is used to illuminate a plane X—X in the fluid flow. It is the velocities of the fluid through the plane X—X which are measured.

The light sheet incident on the fluid flow is scattered by means of fine particles seeded into the flow and it is the scattered light which is collected and analyzed in the imaging system 4. The size of the particles seeded into the fluid flow must be such as to ensure the particles follow the natural motion of the fluid. Moreover, where transonic velocities are involved, for example in an analysis of turbines, the particles must have the ability to respond to step changes in velocity associated with shock waves. With the fluid velocity measurement apparatus described, particles having a size of approximately 0.5 $\mu$m and a specific gravity 1 are used to seed the fluid. It will of course be apparent that the size of the particles may vary depending upon the extent of the turbulence and the average velocity of the fluid flow. Particles having a diameter of between 0.5 $\mu$m to 10.0 μm may be used depending upon the fluid. The particles may be made of latex but any material having a high refractive index and thereby a light scattering index is suitable. The particles may be seeded in numbers as low as 10 mm$^{-3}$ or up to 10,00 mm$^{-3}$ depending on the balance between the available laser power and the sensitivity of the imaging system.

Figure 2:
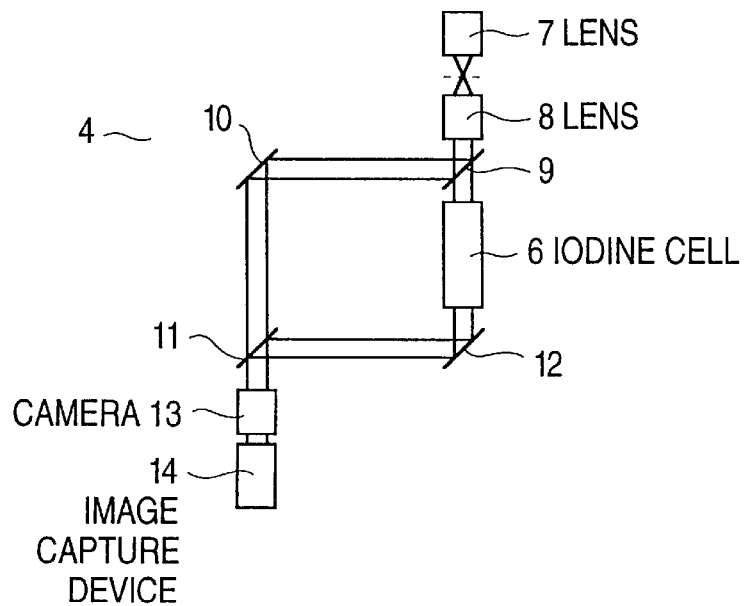
FIG. 2 is an enlarged diagram of the imaging system of FIG. 1.
Figure 6:
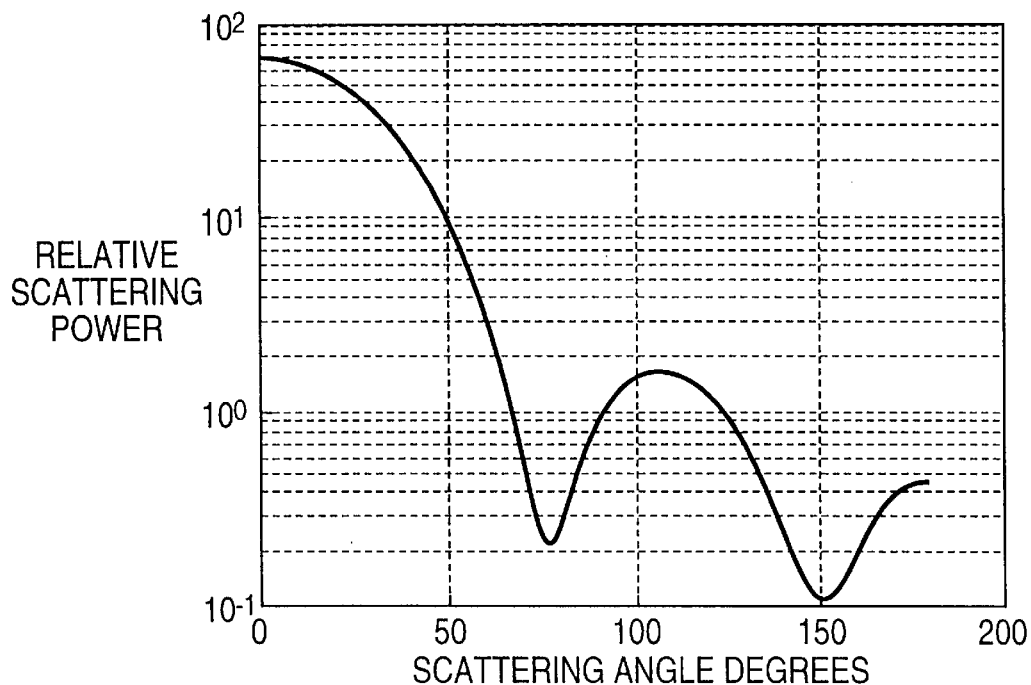
FIG. 6 is a graph showing the relationship of scattering power to scattering angle.

The angle at which the illuminated region or plane is viewed, i.e. the scattering angle, also affects the intensity of the scattered light ultimately used to measure the fluid flow velocities. FIG. 6 is a graph showing the relationship of the scattering power to the scattering angle. The results were obtained using a particle diameter of 0.5 μm and a refractive index of 1.4. As may be seen from the graph, the variation in the scattering power is quite considerable with scattering being strongest in the forward direction. However, in order to provide global velocity measurements the scattering must be viewed at an oblique angle and so neither the forward nor the back scattering directions are used as viewing angles. Instead a side viewing angle is used. Two minima occur in side scattering angles at approximately 75° and 150°. Ideally the scattering angles where the scattering power is a minimum should be avoided since the scattering light intensity would be low thereby making the detection and measurement of the fluid velocities more difficult. In FIG. 1 a scattering angle of approximately 135° is shown, The scattered light incident on the imaging system 4 is used to analyze the fluid flow velocities through the plane X—X of the light sheet. The imaging system 4 is shown, in an enlarged form, in FIG. 2. The imaging system 4 consists of optical means in the form of a primary lens 7 which captures and focuses the scattered light into the back focal plane of a second lens 8 also known as a transfer lens. The transfer lens 8 outputs collimated light onto a first dielectric beam splitter 9 which separates the light between a reference beam path and an iodine cell beam path. Further optical means in the form of a first mirror 10 reflects the reference light beam towards a second dielectric beam splitter 11. The iodine cell light beam passes through the iodine cell 6, which functions as a frequency-to-intensity converter, to a second mirror 12 which reflects the light which emerges from the iodine cell 6 towards the second beam splitter 11. The second beam splitter 11 directs the two images from the reference beam path and the iodine cell beam path onto the lens of a common camera 13 having a single image frame. The transmission/reflectance characteristics of the imaging system 4 may be determined by, for example, viewing a target of uniform intensity before use. Preferably each of the optical elements employed is non-polarizing.

The primary lens 7 and the transfer lens 8 may be multi-element lenses in order to minimize aberration and to increase the available field of view. The beam expander 3 may also be a multi-element lens, if desired.

The camera 13 is a charged-coupled device (CCD) camera, the output of which is supplied to a single image capture device 14. The image capture device 14 includes 16 bit analogue to digital converters operating at relatively low speed (for example, a few hundred kHz) so as to enable low noise image capture, The device 14 also controls the camera 13 and in particular the exposure time period.

Means are provided to spatially align the images from the reference beam path and the iodine cell beam path received by the camera 13 before operation of the velocity measurement apparatus. The image frame of the camera 13 is divided into a two dimensional array of pixels which ideally are large in size and have a high full well capacity. The array is divided into two adjacent fields or regions 131 and 132 with each field having its own two dimensional sub-array 133 of pixels. Each pixel in the first of the two fields corresponds to a pixel in the second and each pair of corresponding pixels relates to a selected spatial location on the plane X—X. When in use, paired pixels, one in each field, e.g. 134 and 135, generate images of the same spatial location of the target. In this way paired pixels view the same spatial point in the object plane X—X and velocity measurements of the fluid flow on a paired pixel basis for comparison with the absorption curve of the iodine may be performed. For coarse alignment of the imaging system 4, test targets are provided and are viewed through the imaging system 4 and the elements of the imaging system adjusted where appropriate to ensure alignment of the image in the paired pixels. Point light sources may then be viewed in at least two separate pairs of pixels for fine alignment of the two beam paths before operation of the velocity measurement apparatus. By moving the point light source, the geometric properties of the imaging system 4 may also be determined.

Figure 4:
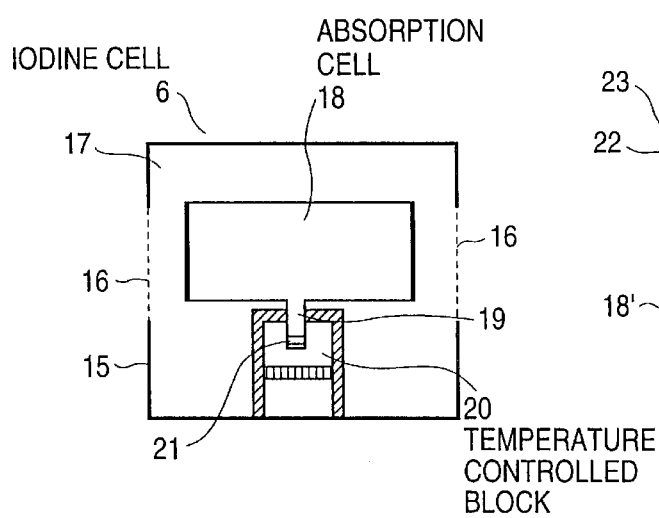
FIG. 4 shows schematically a frequency-to-intensity converter used in the imaging system of FIG. 2.

With reference to FIG. 4, the iodine cell 6 is shown in detail. The iodine cell 6 has an outer casing or housing 15 which has opposing windows 16 in end walls which are aligned with the beam path in the imaging system 4. The windows 16 are substantially transparent to light at the frequencies of interest and ideally have an anti-reflection coating. The outer casing 15 defines a heated chamber 17 the temperature of which is carefully controlled by means mounted about the casing (not shown). Within the chamber 17 an absorption cell 18 is mounted so as to be aligned with the windows 16 and the beam path. The absorption cell 18 contains iodine vapor and has at its base a downwardly projecting finger 19 which is in communication with the interior of the absorption cell 18. About the finger 19 is a temperature controlled block 20 set at a temperature slightly less than the temperature of the chamber 17. The block 20 ensures that the finger 19 is held at a temperature less than the temperature of the main body of the absorption cell 18.

This arrangement ensures that spurious "cool spots" in the main body of the absorption cell 18 are prevented and the optical surfaces of the absorption cell 18, facing the windows 16 of the casing 15, are kept free of iodine crystal formations. Since the finger 19 is kept cooler than the main body of the cell any iodine crystals 21 are formed within the finger 19 away from the optical surfaces.

Instead of a temperature controlled block 20, a thermoelectric cooler may be used mounted on the end of the finger 19 so as to keep it cooler than the main body of the absorption cell 18. With either arrangement the number density of gas phase molecules is kept constant within the cell thereby ensuring a more consistent absorption response to the light passing through the cell. Of course alternative absorption cells containing halogen or a metallic vapor may be used instead of iodine. Even small variations in temperature of the absorption cell 18 have been found to significantly alter the absorption characteristics of the cell and thereby the measurement accuracy of the apparatus. With the iodine cell 6 described above the temperature of the iodine cell can be exactly controlled thereby enabling absolute velocity measurements to be made to the accuracy discussed earlier.

Although not shown in the drawings, the absorption cell windows, which also have an anti-reflection coating, are mounted at non-orthogonal angles to the optical axis so as to minimize spurious reflections and optical losses. Moreover, it will be understood that the absorption cell described may be used in other situations and systems than with the apparatus described herein.

Figure 5:
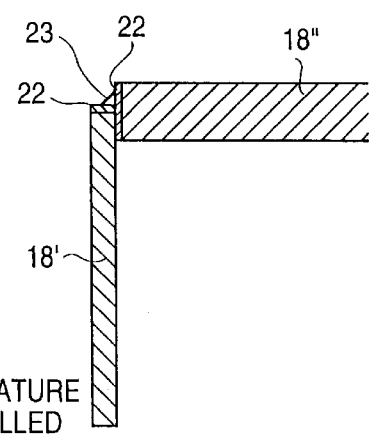
FIG. 5 shows in detail the construction of one corner of the converter of FIG. 4.

In addition, it has been found that the manufacture of the body of the absorption cell and in particular the manner of mounting the windows can distort the windows and thereby introduce stresses which cause optical aberrations in the beam path. In FIG. 5 a corner of the absorption cell 18 with walls 18' and 18" is shown. So as to reduce any stresses which may be induced in the walls 18', 18", the cell is constructed by evaporating a metal 22 onto the edges of the walls 18', 18". Thereafter the walls 18', 18" are attached to one another along their edges by low temperature soldering/brazing 23 onto the metal 22. In this way the level of uncorrected aberration may be reduced, In addition, the lifetime of the cell has been found to have been improved and the ingress of other gases into the cell substantially prevented. This same process may be used to mount other optical elements in the apparatus. Also, the process may be used for optical elements separate from the described apparatus where aberrations in the optical elements are to be minimized.

One method of depositing a metal, for example copper, onto the edges of an optical element such as a glass window is as follows. An electron beam evaporator with a magnetically focussed bent beam source is used within a chamber which is held at a pressure of $1 \times 10^4$ mbar. A ceramic crucible is also located within the chamber and is mounted in a water cooled copper block. The copper evaporant material is placed in the ceramic crucible and the target, in this case the edges of the glass window, is positioned within the chamber and held at a temperature of approximately 50° C. A current rating of 350 mA at 5 kV potential yields a typical evaporation rate of 3000 A/min. Under these conditions the evaporation process takes around 15 minutes. Unwanted copper deposited on the target is removed photolithographically and regions on the target where deposition of the copper is not desired are masked during the evaporation stage.

The fluid velocity measurement apparatus enables accurate absolute measurements of the velocities in the fluid. The calibration system 2 is provided to monitor one or more parameters of the apparatus. With the apparatus shown in the drawings one of the parameters which the calibration system detects and monitors is variations in the output of the laser source. In this way the velocity calculating device 5 can make adjustments in the final velocity calculation for variations in the frequency and intensity of the output from the laser source 1 and so reduce the allowed deviation of the resultant calculated velocities. A portion of the light from the laser source 1 is directed away from the beam path to the expander 3 and instead is directed to the calibration system 2 by means of a source dielectric beam splitter 24.

Figure 3:
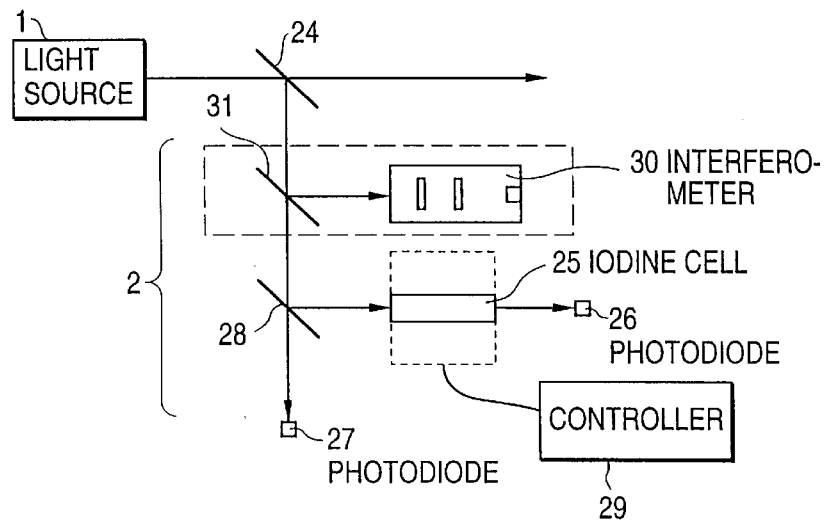
FIG. 3 is a diagram of the calibration system of FIG. 1.

The calibration system 2 is shown in more detail in FIG. 3. A reference absorption cell 25 is provided in the calibration system 2 which is used to monitor the fluctuations in the frequency of the output of the laser source 1 by means of a first calibration photodiode 26 which receives the output from the reference absorption cell 25. A second calibration photodiode 27 is provided to monitor the fluctuations in the intensity of the output of the laser source 1. A calibration dielectric beam splitter 28 is located in the beam path from the source beam splitter 24 to supply light to both the reference absorption cell 25 and the second calibration photodiode 27. Where the response of the reference absorption cell 25 to different frequencies of light is known an exact measurement of the output of the laser source can be determined.

The reference cell 25 is thus used as a frequency standard to continuously monitor the laser emissions. A standard argon ion laser is known to exhibit two types of frequency fluctuation. The first is due to thermal effects which cause the expansion and contraction of the resonator, the second is caused by mechanical vibrations which cause a more rapid oscillation in the cavity mirror separation. Water cooling flows are believed to be the main cause of the latter type of fluctuation. Insofar as the former type of fluctuation is concerned, the frequency modulation is manifested as a slow drift in the output frequency between longitudinal resonant modes (approximate separation 140 MHz) and then a rapid "mode hop" back to the original frequency. This frequency modulation is particularly pronounced during warm-up when the resonator is experiencing a rise in temperature. Once warm, the magnitude of the period of the mode hops is minutes and a scanning Fabry-Perot interferometer may be used to monitor the mode hops on an oscilloscope if necessary.

The latter type of fluctuation may be considered an ac component superimposed on the former. The latter type is particularly significant since its time scale can be comparable to the integration period of the CCD camera 13. The scanning Fabry-Perot interferometer is not suitable for monitoring these higher frequency fluctuations of the laser emissions and so instead it is the reference absorption cell 25 which is used as a spectrum analyzer. The higher frequency fluctuations in the frequency of the laser emissions result in equivalent fluctuations in the intensity of the output from the reference cell 25. These fluctuations in intensity are detected by the first calibration photodiode 26 whereas the intensity fluctuation of the laser emissions are detected by the second calibration photodiode 21. High speed analog-to-digital converters (not shown) simultaneously capture and convert the outputs from each of the calibration photodiodes 26, 27 and input the resultant digital results to the velocity calculating device 5. Fluctuations in the output frequency of an argon ion laser have been found of the order of 200 Hz oscillation with an amplitude of 10 MHz. Such a variation could represent an error up to 6 m/s in the calculated velocity. However, by monitoring the laser source output during the integration period of the CCD camera 13, such fluctuations are accounted for by the velocity calculating device 5.

Ideally, the reference absorption cell 25 is substantially identical in construction to the absorption cell 6 in the imaging system 4. Hence, the reference absorption cell 25 is an iodine cell the temperature of which is carefully monitored and controlled by a controller 29. The temperature of the cell can vary from 20° C. to 45° C. if control of the temperature is not performed. The controller 29 employs a closed loop temperature control to ensure that the temperature of the iodine cell 25 is kept substantially constant. In addition, the iodine cell 25 is constructed to have a high thermal inertia. Since the temperature of the reference iodine cell 25 is known, the determined laser frequency can be related to the iodine cell 6 in the imaging system 4 when in use even though the imaging iodine cell 6 may be at a different temperature.

Alternatively or additionally the calibration system 2 may include a temperature measuring device for monitoring the temperature of the iodine cell 6 in the imaging system 4. In this way any variation in the temperature of the body of the cell 6 may be accounted for in the final velocity calculation. It has been shown that even small variations in temperature can significantly affect the response of the cell. Reference in this respect should be made to FIG. 7 and temperature variations between 20° C. and 45° C. are possible.

The calibration or measuring system 2 may therefore include a further light source (not shown) which is transmitted parallel to or at an angle to the main beam path through the cell 6. A photodiode (not shown) detects the emergent beam from the further light source. Variations in the intensity of the emergent beam is then used as a measure of any temperature fluctuations in the cell 6. For this purpose either the further light source is capable of generating a stable constant intensity beam of light or the variation of the output from the further light source is monitored by splitting the output by means of a beam splitter and using two detectors so as to make a comparative measurement of the variation in intensity of the emergent beam and thereby the temperature of the cell. Alternatively, this arrangement may be used to actively control the temperature of the cell 6. Thus any measured variation in the intensity of the emergent beam detected by the photodiode may be fed back to the temperature controlling device to ensure the temperature is kept constant. The further light source may be derived from the light source 1 or may be independent of the light source 1.

Figure 7:
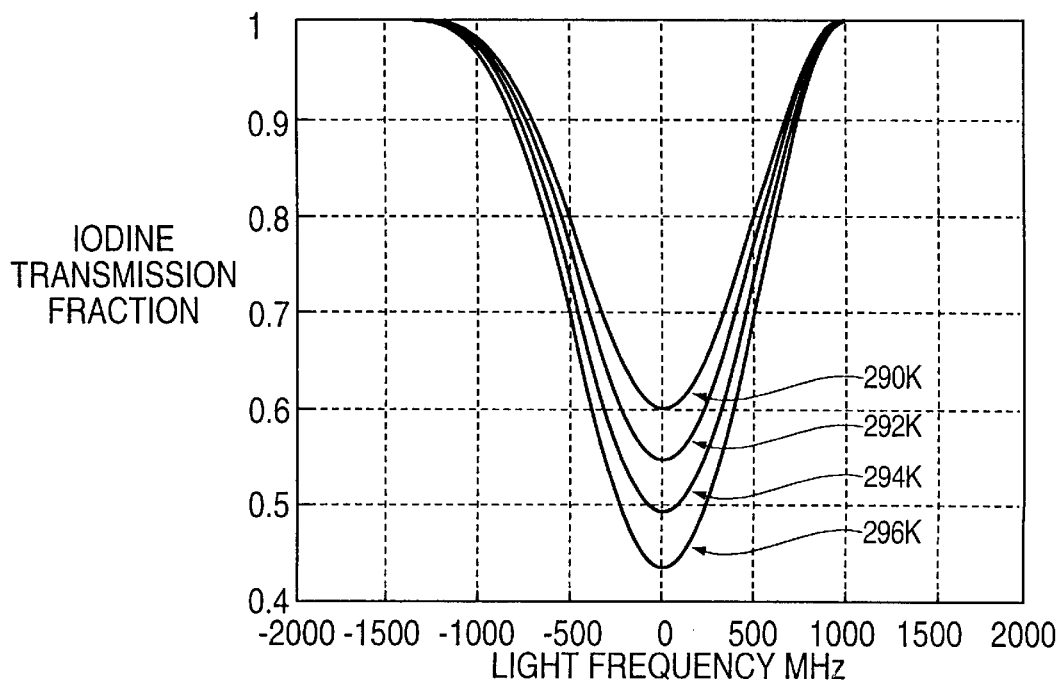
FIG. 7 is a graph showing the transmission profiles of an iodine cell at different temperatures.

The calibration or measuring system 2 is also used prior to operation of the fluid velocity measurement apparatus so as to determine the transmission characteristics of the absorption cell. The known transmission function of the absorption cell with respect to frequency and temperature assists in accurate calculation of the fluid velocities. FIG. 7 is a graph of experimental data on the transmission profiles of an iodine cell at a selection of temperatures. The fluid velocity measurement system enables quick and simple calibration of the transmission characteristics of the absorption cell, for example an iodine cell, on site immediately prior to operation of the measurement apparatus.

For calibration of the iodine cell a calibration system similar to that described earlier with reference to the active monitoring of the measurement apparatus during operation is utilized and is shown in FIG. 3. In this case however the reference absorption cell 25 is replaced by the absorption cell 6 to be calibrated. Moreover, a scanning Fabry-Perot interferometer 30 is added which receives a portion of the laser emissions from the source dielectric beam splitter 24 by the addition of a further calibration dielectric beam splitter 31. The interferometer 30 and beam splitter 31 are indicated within a dotted box since they are not in place when the calibration system 2 is in use during operation of the fluid velocity measurement apparatus. The interferometer 30 monitors the frequency of the laser emissions at the same time as the output of the absorption cell 6 is monitored by the calibration photodiode 26. The output intensities of the absorption cell 6 with respect to laser frequency and intensity (from calibration photodiode 27) and temperature are then recorded. As the laser frequency and the cell temperature are varied, performance characteristics of the absorption cell 6 are determined and stored in a memory of the velocity calculating device 5. The interferometer 30 is held at a substantially constant temperature by mounting the interferometer 30 in a thermally stable environment during the calibration of the cell.

Operation of the fluid velocity measurement apparatus is as follows.

Initially, the iodine cell 6 which will later be used in the imaging system 4 is calibrated using the calibration system 2 shown in FIG. 3. The laser emissions from the source 1 are caused to sweep across its gain bandwidth and the variation in frequency during the sweep is measured by the interferometer 30. At the same time, the laser emissions are also incident on the iodine cell 6 being calibrated and a ratio of the output intensity from the cell measured by the first calibration photodiode 26 to the intensity of the laser emissions measured by the second calibration photodiode 27 is determined providing data on the cell transmission characteristics with respect to frequency. During this operation the temperature of both the interferometer 30 and the iodine cell 6 are kept constant. Thereafter the calibration is repeated at different temperatures for the iodine cell 6 and in this way a transmission profile of the iodine cell 6 across frequency and temperature is achieved, the results of which are stored in the memory of the velocity calculating device.

After pre-calibration of the iodine cell, the cell is mounted in the imaging system 4. It will of course be appreciated that during pre-calibration the source beam splitter 24 may be replaced by a mirror so that all of the output of the laser source 1 may be used in the cell-calibration. Once the calibrated iodine cell 6 has been mounted in the imaging system the two beam paths through the imaging system are aligned. As mentioned above, coarse alignment is achieved by viewing test targets. Precise alignment is then performed by using point light sources. The images from the two beam paths are arranged so that the images in the two beam paths of a point light source appear in the adjacent fields of the array of pixels in the CCD camera 13 in corresponding pixel elements. The location of the point light source is varied to ensure that the beam paths are aligned in both dimensions of the pixel array.

The fluid velocity measurement apparatus is now ready for operation. As discussed earlier, during operation the interferometer 30 and corresponding beam splitter 31 are removed from the calibration system 2 and a reference iodine cell 25 added to replace the calibrated iodine cell 6 which has been moved to the imaging system 4. Preferably, the reference iodine cell 25 has also been calibrated.

The laser source 1 and beam expander 3 are arranged to direct the laser emissions as a sheet onto a region of the fluid flow of interest. An apparatus for seeding the flow field are provided, for example a piston tube (not shown) which is primed with appropriately sized particles immediately prior to the operation run. During the run the fluid and seeding are compressed and forced through the system being tested. As the particles move across the illuminated region, the particles scatter the light and the frequency of the scattered light is Doppler-shifted in accordance with the following equation:

$$\Delta v = v_0 \cdot \left( \frac{\hat{o} - \hat{i}}{c} \right) \cdot \underline{V} \qquad (1)$$

Where $\Delta v$ is the Doppler-shift, $V_o$ the laser frequency, $\hat{o}$ the observation direction, $\hat{i}$ the light propagation direction and $\underline{V}$ the particle velocity.

Since the Doppler-shift is sensitive to the component of the velocity in the direction of O-i, three components of the velocity can be derived by using three imaging systems. However, by virtue of the physical restrictions on the system, the imaging systems are normally configured to measure three non-orthogonal components of the velocity the results of which are subsequently resolved.

The fluid velocity measurement apparatus may be used to measure the velocities of two phase flows such as a mixture of a gas and a liquid as an aerosol. The average size of the aerosol particles of the liquid are such that it is unlikely the particles will mimic the velocities in the gas. Hence, by monitoring the light scattered by the aerosol particles and the light scattered by the seeded particles in the gas flow either sequentially or simultaneously, information of the gas velocities and separately the aerosol particles velocities may be obtained. Naturally the apparatus may also be used to measure the velocity of solid particulates in suspension in either a gas or liquid. In each of the cases discussed above, with the apparatus described, velocities in two phase flows may be accurately measured.

Furthermore, the fluid velocity measurement apparatus described may be used with transient turbine simulation. In these circumstances the results of the velocity measurements may not be required in real-time and instead may be computed after all the data has been collected thereby enabling high time resolution of the data.

During operation of the measurement apparatus the intensities from the imaging iodine cell 6 received by the CCD camera 13 along with the intensities from the reference beam path of the imaging system 4 are digitally input and stored into the velocity calculating device 5 via the image capture device 14. The velocity calculating device 5 is in the form of a general purpose computer programmed to compute the fluid velocity field on the basis of the difference in intensities between the two beam paths through the imaging system 4. The transmission characteristics of the imaging iodine cell 6 are stored in a memory of the computer 5 following calibration of the cell along with algorithms such as equation (1). Fluctuations in the laser source 1 are also input into the computer 5 via the calibration system 2. With this information accurate absolute values of the velocities of the fluid flow are generated.

It will of course be understood that the reflectance/transmission characteristics of the imaging system may be determined so as to enable accurate relative intensity measurements to be made.

Where a pulsed Nd:YAG laser is used instead of the argon ion laser, the fluid velocity measurement apparatus is operated in the same way and will enable frozen field images of the flow velocities to be obtained. Synchronization of the pulses of the laser with the imaging system 4 will be achieved by utilizing an asynchronous reset camera appropriately triggered.

Since a single camera is used for imaging both reference and absorption cell beams, the control circuitry for the image capture device and subsequent analysis of the results is very much simplified. Moreover, no synchronization between the reference and the absorption cell images is necessary. In addition, in order to enhance the dynamic range of the CCD camera 13, a low noise liquid nitrogen and/or Peltier cooled CCD camera 13 may be used. Also, the improved accuracy of the measurements made by the camera means that velocity measurements at much lower velocities are possible, for example the measurement of the aerodynamics of cars. The apparatus may also be used in conjunction with a telescope to view more distant fluid flows.

The fluid velocity measurement apparatus described may also be used to determine an average velocity at a point in the fluid flow In order to do this, the beam expander 3 is replaced by a lens which focuses the light from the light source to a waist at a point in the fluid flow. The light scattered from the fluid at that point is then focused on the absorption cell 6 so as to give an average measurement of the fluid velocity at that point. It will of course be understood that with this alternative arrangement the CCD camera may be replaced by two photodetectors, one for the reference image and one for the absorption cell image, since no spatial resolution of the images is required. This enables the velocity measurements to have a much higher time resolution. The use of the point light source enables a mainly localized area of the image plane to be mapped during operation of the apparatus. Moreover, with suitable calibration the fluid velocity measurement apparatus may also be used to measure the temperature of the fluid by analysis of the extent of the Doppler broadening in the scattered light and to measure the density of the fluid.

It will of course be apparent that the optical systems described may incorporate or utilize optic fibers for precise alignment and measurement where appropriate. Other adaptions and alterations of the apparatus and method are envisaged without departing from the spirit and scope of the present invention.

With the apparatus described above the absolute level of accuracy of measurement is limited by the accuracy of the laser frequency and a noise component must also be allowed for. The apparatus described above provides a deviation with the measurements taken of $\pm 0.75$ ms$^{-1}$ for the calculated fluid velocity. This is in contrast with conventional systems which provide for a deviation of up to ten times this amount, as mentioned earlier.

Thus, with the apparatus and method described above, significantly more exact three dimensional measurements of a fluid velocity field may be achieved.

We claim:

1. A fluid velocity measuring apparatus for use with a moving fluid seeded with light scattering articles, said apparatus comprising:

a narrow linewidth light source operable to produce output light;

a lens device arranged to direct the output light of said light source onto a selected region of the moving fluid seeded with light scattering articles;

an imaging system for analyzing light scattered from the selected region of the fluid, said imaging system including a beam splitting device for collecting the scattered light and for dividing the light collected by said beam splitting device into first and second portions, a frequency-to-intensity converter for receiving the first portion of the light divided by said beam splitting device and for emitting light having an intensity which is representative of a frequency of the light collected by said beam splitting device, a common light intensity detector having a single image frame including a pixellated array divided into first and second regions with each pixel in said first region having a corresponding paired pixel in said second region, an optical system arranged to direct the light emitted by said frequency-to-intensity converter and the second portion of the light divided by said beam splitting device to said single image frame of said common light intensity detector and to align said pairs of pixels in said first and second regions of said single image frame to receive light from a same spatial location; and a velocity calculating device, in communication with said imaging system, for calculating a velocity of the fluid in the selected region based on a Doppler-shift in frequency of the scattered light with respect to a frequency of the output light of said light source.

2. A fluid velocity measuring apparatus as claimed in claim 1, wherein said lens device is provided between said light source and the moving fluid and is operable to focus the output light into a sheet intersecting the moving fluid at a selected two dimensional region.

3. A fluid velocity measuring apparatus as claimed in claim 1, wherein said common light intensity detector comprises a charge coupled device camera.

4. A fluid velocity measuring apparatus as claimed in claim 3, wherein said frequency-to-intensity converter comprises a cell containing a gas or vapor having absorption characteristics which vary with light frequency.

5. A fluid velocity measuring apparatus as claimed in claim 4, where said frequency-to-intensity converter comprises an iodine cell.

6. A fluid velocity measuring apparatus as claimed in claim 1, wherein said lens device is provided between said light source and the moving fluid and is operable to focus the output light to a selected point in the moving fluid to enable measurement of an average spatial velocity of the fluid at the selected point.

7. A fluid velocity measuring apparatus as claimed in claim 6, wherein said frequency-to-intensity converter comprises a cell containing a gas or vapor having absorption characteristics which vary with light frequency.

8. A fluid velocity measuring apparatus as claimed in claim 1, wherein said light source comprises a laser.

9. A fluid velocity measuring apparatus for use with a moving fluid seeded with light scattering articles, said apparatus comprising:
- a narrow linewidth light source operable to produce output light;
- a lens arranged to direct the output light of said light source onto a selected region of the moving fluid seeded with light scattering articles;
- an imaging system for analyzing light scattered from the selected region of the fluid and including a pre-calibrated frequency-to-intensity converter for emitting light having an intensity which is representative of a frequency of the light scattered from the selected region of the fluid;
- a measuring device for monitoring fluctuations in at least one of the output light of said light source and a temperature of said frequency-to-intensity converter; and
- a velocity calculating device including an addressable memory operable for storing calibration data of said frequency-to-intensity converter with respect to the fluctuations monitored by said measuring device, said velocity calculating device being in communication with said imaging system and said measuring device and being operable for calculating a frequency of light incident on said frequency-to-intensity converter with respect to the fluctuations monitored by said measuring device, a Doppler-shift in frequency of the light scattered from the selected region of the fluid with respect to a frequency of the output light of said light source, and a velocity of the moving fluid in the selected region based on the frequency of light incident on said frequency-to-intensity converter and the Doppler-shift in frequency of the light scattered from the selected region of the fluid calculated by said velocity calculating device.

10. A fluid velocity measuring apparatus as claimed in claim 9, wherein said measuring device is operable to measure frequency fluctuations in the output light of said light source.

11. A fluid velocity measuring apparatus as claimed in claim 10, wherein said measuring device comprises a frequency-to-intensity converter.

12. A fluid velocity measuring apparatus as claimed in claim 11, wherein said measuring device comprises at least one photodiode.

13. A fluid velocity measuring apparatus as claimed in claim 10, wherein said measuring device comprises at least one photodiode.

14. A fluid velocity measuring apparatus as claimed in claim 9, wherein said lens device is provided between said light source and the moving fluid and is operable to focus the output light into a sheet intersecting the moving fluid at a selected two dimensional region.

15. A fluid velocity measuring apparatus as claimed in claim 9, wherein said lens device is provided between said light source and the moving fluid and is operable to focus the output light to a selected point in the moving fluid to enable measurement of an average spatial velocity of the fluid at the selected point.

16. A method of calculating a velocity of a moving fluid, said method comprising:
- seeding the moving fluid with light scattering particles;
- illuminating a selected region of the fluid with light having a narrow linewidth;
- collecting light scattered from the selected region of the fluid and dividing the collected light into first and second portions;
- analyzing the first portion of the collected light by passing the first portion of the collected light through a frequency-to-intensity converter whereby an intensity of an output of the converter is representative of a frequency of light passing through the frequency-to-intensity converter;
- directing the second portion of the collected light and the output of the frequency-to-intensity converter towards an image frame of a common light intensity detector, wherein the single image frame includes a pixellated array divided into first and second regions with each pixel in the first region having a corresponding paired pixel in the second region aligned so as to receive light from a same spatial location;
- measuring an intensity of the output of the frequency-to-intensity converter and an intensity of the second portion of the collected light incident on the single image frame; and
- calculating the velocity of the moving fluid in the selected region based on the measured intensities of the frequency of the scattered light and a Doppler-shift in frequency of the scattered light with respect to the frequency of the light illuminating the selected region.

17. A method of calculating a velocity of a moving fluid, said method comprising:
- calibrating a frequency-to-intensity converter and storing calibration data in a memory;
- seeding the moving fluid with light scattering particles;
- illuminating a selected region of the fluid with output light having a narrow linewidth from a light source;
- monitoring fluctuations in at least one of the output light of the light source and a temperature of the frequency-to-intensity converter;
- analyzing light scattered from the selected region of the moving fluid with the calibrated frequency-to-intensity converter, wherein an output intensity of the frequency-to-intensity converter is representative of a frequency of the scattered light;
- measuring the output intensity of the frequency-to-intensity converter; and
- calculating the velocity of the moving fluid in the selected region based on the measured output intensity and the monitored fluctuations with reference to the stored calibration data, the frequency of the scattered light, and a Doppler-shift in frequency of the scattered light with respect to the frequency of the light illuminating the selected region.

18. A frequency-to-intensity converter comprising:

a housing defining a chamber and having opposing windows substantially transparent to light;

an absorption device mounted within said chamber defined by said housing and having windows substantially transparent to light arranged to face said windows of said housing, said absorption device defining an absorption chamber containing a gas or vapor having light absorption properties which vary with light frequency and including a downwardly directed member in communication with said absorption chamber; and a temperature controlling device for maintaining said chamber defined by said housing, and thereby said absorption chamber, at a substantially constant temperature and including cooling means for maintaining said downwardly directed member of said absorption device at a temperature less than the temperature of said chamber defined by said housing and said absorption chamber.

* * * * *